United States Patent [19]

Glott

[11] Patent Number: 5,651,134
[45] Date of Patent: Jul. 22, 1997

[54] METHOD FOR CONFIGURING A CACHE MEMORY TO STORE ONLY DATA, ONLY CODE, OR CODE AND DATA BASED ON THE OPERATING CHARACTERISTICS OF THE APPLICATION PROGRAM

[75] Inventor: Jan G. Glott, West Columbia, S.C.

[73] Assignee: NCR Corporation, Dayton, Ohio

[21] Appl. No.: 329,389

[22] Filed: Oct. 26, 1994

[51] Int. Cl.⁶ ........................................................ G06F 13/00
[52] U.S. Cl. ................... 395/445; 395/450; 395/462; 395/452; 395/453; 395/449
[58] Field of Search ............................... 395/450, 462, 395/452, 453, 449, 425, 421, 800, 275; 364/200, 900; 371/51

[56] References Cited

U.S. PATENT DOCUMENTS

| | | | |
|---|---|---|---|
| 4,521,851 | 6/1985 | Trubisky et al. | 364/200 |
| 4,580,240 | 4/1986 | Watanabe | 364/900 |
| 4,707,784 | 11/1987 | Ryan et al. | 364/200 |
| 4,719,568 | 1/1988 | Carrubba et al. | 364/200 |
| 4,783,735 | 11/1988 | Miu et al. | 364/200 |
| 4,884,197 | 11/1989 | Sachs et al. | 364/200 |
| 4,910,656 | 3/1990 | Scales, III et al. | 364/200 |
| 4,942,579 | 7/1990 | Goodlander et al. | 371/51 |
| 4,992,977 | 2/1991 | Matoba et al. | 364/900 |
| 5,095,424 | 3/1992 | Woffinden et al. | 395/425 |
| 5,150,465 | 9/1992 | Bush et al. | 395/275 |
| 5,155,833 | 10/1992 | Cullison et al. | 395/425 |
| 5,179,689 | 1/1993 | Leach et al. | 395/425 |
| 5,214,770 | 5/1993 | Ramanujan et al. | 395/425 |
| 5,228,136 | 7/1993 | Shimizu et al. | 395/425 |
| 5,345,576 | 9/1994 | Lee et al. | 395/425 |
| 5,349,672 | 9/1994 | Nishimukai et al. | 395/800 |
| 5,375,216 | 12/1994 | Moyer et al. | 395/421 |
| 5,386,579 | 1/1995 | Bourekas et al. | 395/800 |
| 5,410,669 | 4/1995 | Biggs et al. | 395/425 |

*Primary Examiner*—Thomas C. Lee
*Assistant Examiner*—Duo Chen
*Attorney, Agent, or Firm*—Paul W. Martin

[57] ABSTRACT

A method for configuring a cache memory which configures a bus controller to select either code only, data only, or code and data for storage in the cache memory. The configuration method includes the steps of flushing the cache memory, and setting a configuration bit within a cache controller to cause the bus controller to select either code only, data only, or code and data for storage in the cache memory.

1 Claim, 1 Drawing Sheet

METHOD FOR CONFIGURING A CACHE MEMORY TO STORE ONLY DATA, ONLY CODE, OR CODE AND DATA BASED ON THE OPERATING CHARACTERISTICS OF THE APPLICATION PROGRAM

CROSS-REFERENCE TO RELATED APPLICATIONS

The present application is related to the following commonly assigned and co-pending applications:

"Cache Memory Which Includes SRAM and DRAM Memory Modules", filed Oct. 26, 1994, invented by Bisbee et al., and having a serial number of 08/329,391, now abandoned.

"Method For Diagnosing A Cache Memory", filed Oct. 26, 1994, invented by Glott et al., and having a serial number of 08/329,390, now abandoned.

BACKGROUND OF THE INVENTION

The present invention relates to cache memory in computer systems, and more specifically to a method for configuring a cache memory.

Computer systems today typically use dynamic random access memory (DRAM) as the primary operating memory for storing code and data used by a processor. Such systems typically employ faster static random access memory (SRAM) for cache memory.

Typical cache memories store code and data without differentiating between the two. One disadvantage associated with this use of cache memories is that operating efficiency suffers.

Therefore, it would be desirable to provide a method for configuring a cache memory to contain code only, data and code, or data only to increase operating efficiency.

SUMMARY OF THE INVENTION

In accordance with the teachings of the present invention, a method for configuring a cache memory is provided. In a first embodiment, the configuration method includes the steps of flushing the cache memory, and setting a configuration bit within a cache controller to cause a bus controller to select only data for storage in the cache memory.

In a second embodiment, the configuration method includes the steps of flushing the cache memory, and setting a configuration bit within a cache controller to cause a bus controller to select data and code for storage in the cache memory.

In a third embodiment, the configuration method includes the steps of flushing the cache memory, and setting a configuration bit within a cache controller to cause a bus controller to select only code for storage in the cache memory.

It is accordingly an object of the present invention to provide a method for configuring a cache memory.

It is another object of the present invention to provide a method for configuring a cache memory to increase operating efficiency.

It is another object of the present invention to provide a method for configuring a cache memory to contain code only, data and code, or data only to increase operating efficiency.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
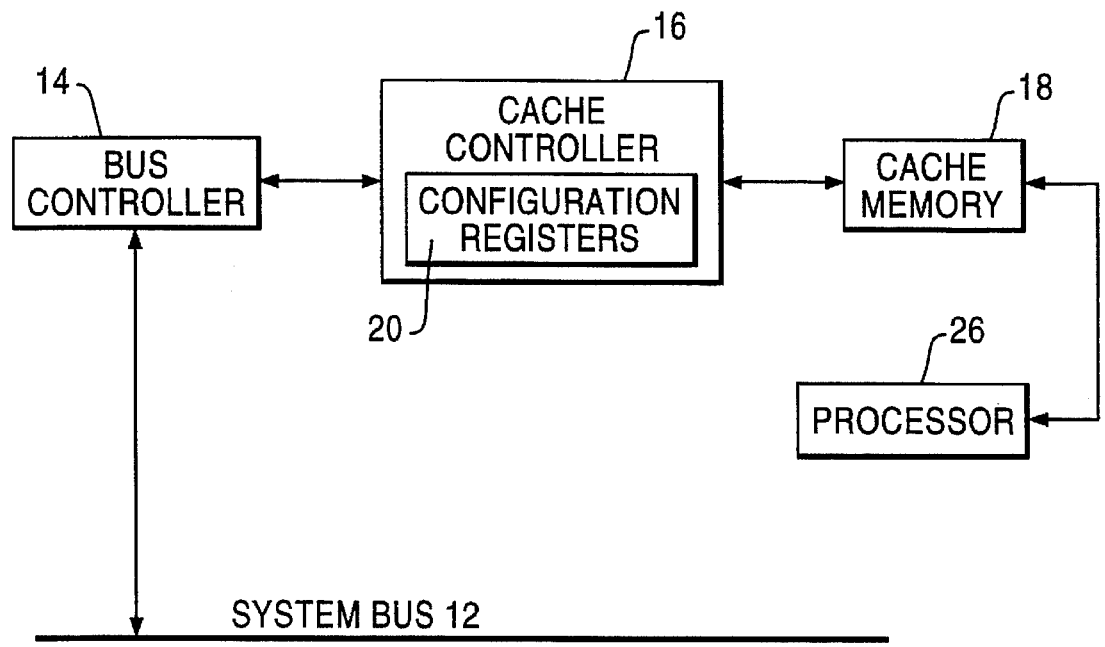
FIG. 1 is a block diagram of a computer system employing the method of the present invention.

Referring now to FIG. 1, computer system 10 includes system bus 12, bus controller 14, cache controller 16, cache memory 18, and processor 26.

System bus 12 provides a transmission path for data and code within system 10.

Bus controller 14 controls the flow of data and code between system bus 12 and cache controller 16.

Cache controller 16 is preferably a second or third level cache controller. Cache controller contains configuration register 22, whose contents determine whether bus controller 14 selects data and/or code for storage within cache memory 18. Cache controller 16 also executes an optimization algorithm to determine which mode works best with software executed by processor 26.

Cache memory 18 is preferably a second or third level cache memory.

Processor 26 is the heart of computer system 10. System 10 preferably includes a plurality of such processors.

Figure 2:
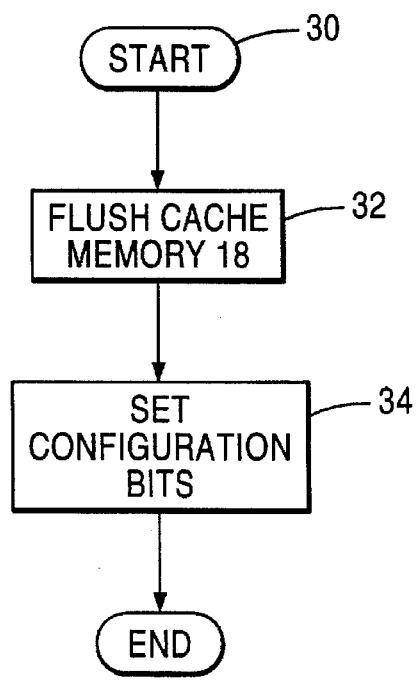
FIG. 2 is a flow diagram of the configuration method of the present invention.

Turning now to FIG. 2, the configuration method of the present invention is explained in more detail, beginning with START 30.

In step 32, processor 26 flushes cache memory 18.

In step 34, processor 26 sets the configuration bits of configuration register 20 to cause bus controller 14 to select data only, code and data, or code only for storage within cache memory 18. The "code only" and "code and data" modes are preferably used the most frequently to increase operating efficiency.

Although the present invention has been described with particular reference to certain preferred embodiments thereof, variations and modifications of the present invention can be effected within the spirit and scope of the following claims.

What is claimed:

1. A method for configuring a cache memory within a computer system comprising the steps of:

determining operating characteristics of an application program by a processor coupled to the cache memory;

determining an optimal mode of operation within a plurality of possible modes of operation for the cache memory by the processor from the operating characteristics of the application program, wherein the plurality of possible modes of operation consist of a first mode which selects only data for storage in the cache memory, a second mode which selects only code for storage in the cache memory, and a third mode which selects data and code for storage in the cache memory;

flushing the cache memory by the processor; and setting a configuration bit within a cache controller coupled to the cache memory to cause a bus controller coupled to the cache controller to select the optimal mode of operation.

* * * * *